(No Model.) 2 Sheets—Sheet 2.
L. B. BUZBY.
COMBINED CULTIVATOR AND FERTILIZER DISTRIBUTER.
No. 451,805. Patented May 5, 1891.
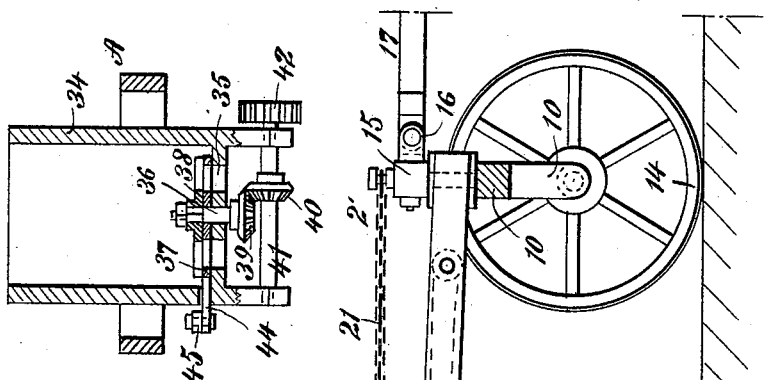
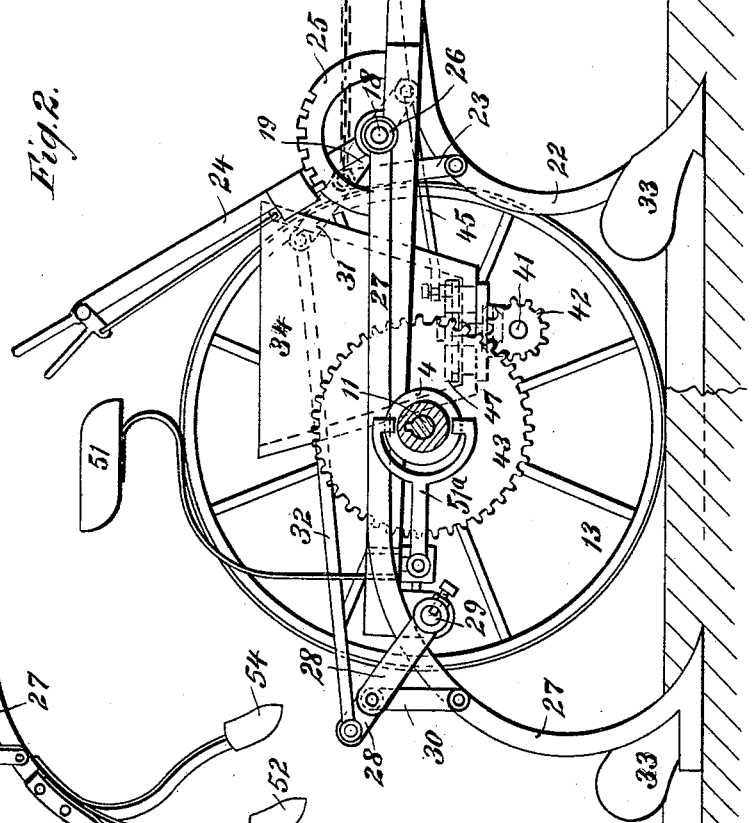
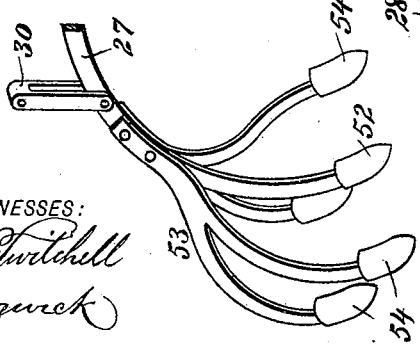
WITNESSES:
Donn Twitchell
C. Sedgwick
INVENTOR:
L. B. Buzby
BY
Munn & Co.
ATTORNEYS

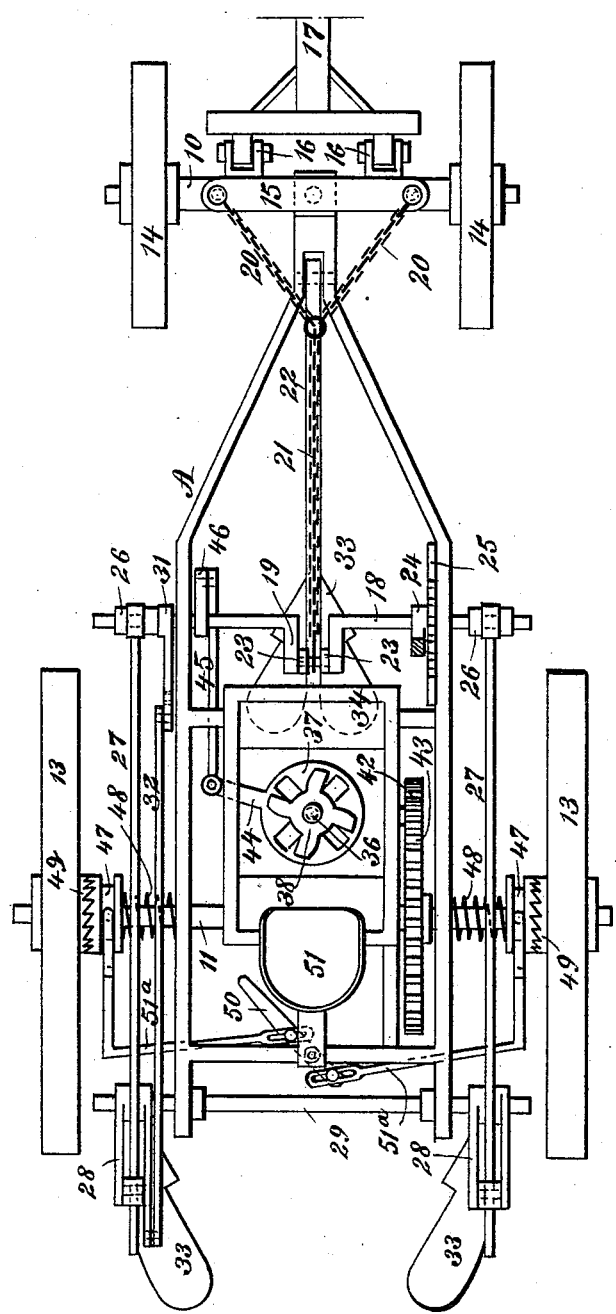

UNITED STATES PATENT OFFICE.

LEHMAN B. BUZBY, OF MAURICETOWN, NEW JERSEY.

COMBINED CULTIVATOR AND FERTILIZER-DISTRIBUTER.

SPECIFICATION forming part of Letters Patent No. 451,805, dated May 5, 1891.

Application filed December 18, 1890. Serial No. 375,065. (No model.)

*To all whom it may concern:*

Be it known that I, LEHMAN BLEW BUZBY, of Mauricetown, in the county of Cumberland and State of New Jersey, have invented a new and Improved Combined Cultivator, Fertilizer-Distributer, and Marker, of which the following is a full, clear, and exact description.

My invention relates to an improvement in agricultural implements, and has for its object to provide a machine of simple and durable construction capable of use as a cultivator with shares or hoes attached, and as a furrower, marker, ridger, or fertilizer-distributer; and a further object of the invention is to provide a means whereby the team may be utilized to lift the plows or shares out of engagement with the ground.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the machine. Fig. 2 is a side elevation thereof, the axles being in section. Fig. 3 is a central vertical section through the box for receiving the fertilizer; and Fig. 4 is a perspective view of a portion of one of the plow-beams, illustrating the application thereto of the hoes.

The frame A is mainly rectangular. The forward end, however, is contracted and the forward extremity is pivoted upon the arched front axle 10, the rear axle 11 being journaled in the rectangular portion of the frame. Large supporting-wheels 13 are loosely mounted upon the rear axle 11, and smaller wheels 14 are located upon the front axle.

Upon the forward end of the frame A a bar 15 is centrally pivoted, which bar has attached thereto upon its forward edge clips 16, adapted to receive offsets from the tongue 17; or the tongue may be attached to the bar in any other suitable or approved manner. In the forward section of the rectangular portion of the frame a crank-shaft 18 is journaled, provided with a central crank-arm 19. To each end of the pivoted bar 15 a length of chain 20 is attached, the two chains being connected with a single chain 21, which chain is attached to the crank-arm of the crank-shaft 18, as is best shown in Fig. 1.

In a recess produced in the forward contracted end of the frame the upper end of a downwardly and rearwardly curved plow-beam 22 is pivoted, the said plow-beam being connected with the crank-arm 19 of the crank-shaft preferably through the medium of links 23, as is best shown in Fig. 2.

Preferably within the frame the crank-shaft 18 is provided with an attached hand-lever 24, having the usual thumb-latch engaging with a rack 25, attached to the frame. The crank-shaft extends beyond each end of the frame, and upon the projecting extremities of the shaft sleeves 26 are mounted, capable of being slid upon the shaft and secured thereon, when desired, by means of set-screws or equivalent devices.

Upon each sleeve 26 the forward end of a downwardly-curved plow-beam 27 is secured, whereby one of the beams is located at each side of the frame between it and the drive-wheel. The plow-beams 27 extend downward through slotted arms 28, adjustable upon the extremities of a shaft 29, which shaft is journaled in suitable bearings in the rear end of the frame, and the plow-beams are connected with the slotted arms by means of links 30 or their equivalents. The shaft 29 is a rock-shaft, and motion is communicated thereto from the crank-shaft through the medium of an arm 31, which is rigidly secured to the crank-shaft outside of and near the frame, as shown in Fig. 1, and a connecting-rod 32, pivotally attached to one of the rear slotted arms 28 and adjustably connected with the crank-shaft arm 31 and through the medium of the connecting-rod 32, the plow-shares 33, attached to the beams 27, may be made to run deep or shallow.

Within the rectangular portion of the frame A a box or hopper 34 is removably located, which box or hopper is provided in its bottom with a series of circularly-arranged openings 35, and in the central portion of the hopper around which the apertures are arranged a vertical shaft 36 is journaled, the said shaft having loosely mounted thereon a disk 37, apertured to correspond to the apertures in the bottom of the hopper and normally the apertures in the disk and those in the hopper are in registry. Above the disk 37 a second disk is securely attached to the shaft 36, provided with a series of horizontal radial arms 38, this latter disk being adapted for use as a stirrer, its functions being to keep the fertilizer in constant agitation and to feed the same through the openings in the hopper. The shaft 36 is provided upon its lower end with a gear 39, which meshes with a similar gear 40, secured to a shaft 41, journaled beneath the hopper, the bearings of the shaft being attached to, or they may be an integral portion of, the hopper. One end of the shaft 41 projects some distance beyond its hanger, and has secured thereon a pinion 42, which meshes with a spur-gear 43, fast upon the rear axle 11 of the machine. The loosely-mounted disk 37 of the hopper is provided with an arm 44, which projects through a slot formed in one side of the hopper near the bottom, as shown in Figs. 1 and 3, and the outer extremity of the arm 44 is connected by a link 45 with a short arm 46, attached to the crank-shaft.

In operation, when it is desired to lift the plowshares out of engagement with the ground, it is only necessary to turn the team to one side, whereupon the tongue 17 acts upon the pivoted bar 15, carrying it out at an angle over the axle, and the bar, by its chain connection 20 and 21 with the crank-shaft, rotates the said shaft sufficiently to elevate its central crank-arm 19, which draws up the forward plow-beam 22, and to also elevate the crank-arm 31, which, through the medium of the connecting-rod 32, causes the rear shaft 29 to rock sufficiently to elevate the arms 28, and thereby raise the rear plow-beams. At the same time that the plow-beams are elevated out of engagement with the ground the arm 46, through the medium of the link 45, operates upon the arm 44 of the loosely-mounted disk 37 in the hopper, and rotates the said disk sufficiently to cause it to close the openings 35 in the bottom of the hopper. Thus a waste of the fertilizing material or of any material contained in the hopper is avoided. The plow-beams may be held in their raised position by causing the latch of the lever 24 to engage with the rack 25, or the rock-shaft may be manipulated directly through the medium of the said lever. Motion is communicated to the axle 11 through the medium of spring-pressed clutches 47, held to slide upon the axle and turn therewith, which clutches are held by the springs 48 in constant engagement with clutch-faces 49, formed upon the inner face of the wheel-hubs 13. As long as the clutches are in engagement with the clutch-faces of the hubs, as the machine is drawn forward the axle is revolved. In backing, however, the clutches slip from engagement with the clutch-faces of the hubs and the axle ceases to be revolved. When it is desired to throw the clutches 47 out of gear or to stop the operation of the distributer, as in going to and from the field, for instance, said result is accomplished through the medium of a shifting-lever 50, fulcrumed upon the frame A at the back and convenient to the driver's seat 51, whereby the driver may manipulate the lever with his feet. Upon the lever 50 two shifting-arms 51ª are pivoted, each of which arms has an engagement with one of the clutches 47, and the said arms are so arranged upon the lever 50 that when the lever is manipulated both of the arms act simultaneously to disengage the clutches from the clutch-faces of the drive-wheels. When plows are employed upon the beams 27 and 22, as shown in Figs. 1 and 2, the center or forward plow 22 creates a furrow for the reception of the fertilizer discharged from the hopper, and the two rear plows having their shares facing serve to ridge up the earth over the fertilizer and put it in shape for planting.

When used as a marker, the central plow is elevated and the two rear plows are brought in engagement with the ground while the machine is driven forward. It is evident that the rear plows may be adjusted a considerable distance toward the frame or away from it, in order to mark or furrow the ground at desired intervals, as the inner ends of the beams 27 are adjustably attached to the crank-shaft, and the arms 28, with which the said beams are also connected, are adjustable upon the rock-shaft 29.

When the machine is used for cultivating purposes only, the hopper may be removed, and as all the gearing is carried by the hopper it is simply necessary before displacing the hopper to disconnect the link 45 either from the arm 46 of the crank-shaft or the arm 44 of the movable disk.

The machine may also be utilized as a hoe-harrow or hoe-cultivator, in which event hoe-blades 52 are substituted for the shares 33, and arms 53, oppositely curved, are attached to the opposite sides of the beams, the said arms 53 being forked at their lower ends, providing two members, to each of which a hoe-blade 54 is secured. Thus each beam may be made to accommodate five shovels, and when the shovels are arranged upon both of the rear beams and also upon the forward beam as the machine is driven forward the ground over which it passes is most thoroughly disturbed and cultivated.

The singletrees are preferably connected by clevis with the end of the frame, whereby the pole is left free to be used for turning or backing only. The link 45, where it connects with the arm 44, may also be provided with a slot, whereby the amount of fertilizer dropped may be gaged on the disk 37, can be made to partially cover the openings in the hopper.

Having thus described my invention, I claim as new and desire to secure by Letters Patent—

1. The combination, with the frame provided with supporting and guiding wheels and a transverse bar centrally connected to the axle of the guide-wheels to swing therewith, of the vertically-swinging plow-beams and a transverse rock-shaft connected with the said plow-beams and with the said transverse bar at opposite sides of its axis, substantially as shown and described.

2. The combination, with the frame having supporting and guiding wheels and a transverse bar centrally connected to the axle of the guide-wheels to swing therewith, a transverse rock-shaft on the frame, and an operating connection between the rock-shaft and the said bar at opposite sides of its center, of the vertically-swinging plow-beams connected beyond their pivotal points with said rock-shaft to permit of their being raised and lowered, and a tongue connected to the said transverse bar for operating it and the guide-wheels, substantially as shown and described.

3. In a machine of the character described, the combination, with a frame, a bar pivoted centrally near one end of the frame, and a tongue or pole connected with the bar at each side of its fulcrum, of a crank-shaft journaled in the frame, plow-beams having one end adjustably pivoted upon the shaft, a connection uniting the plow-beams near their opposite ends with an arm on the shaft, and a connection between the extremities of the pivoted bar and the crank-shaft, as and for the purpose specified.

4. In a machine of the character described, the combination, with a frame, a bar pivoted centrally near one end of the frame, a tongue connected with the bar at each side of its pivot, and a crank-shaft transversely journaled in the frame between its ends, provided with a central crank-arm, of plow-beams adjustably pivoted upon the extremities of the crank-shaft, a rock-shaft journaled in the rear of the frame, provided with adjustable slotted arms through which the plow-beams pass, a link connection between the beams and the arms, an adjustable connecting-rod uniting one of the arms with the crank-shaft, and a connection between the central crank-arm of the crank-shaft and the extremities of the pivoted bar, as and for the purpose set forth.

5. In a machine of the character described, the combination, with a hopper having openings produced in its lower end, a shaft vertically journaled in the hopper, a disk loosely mounted upon the shaft, provided with openings corresponding to the openings in the hopper and having an outwardly-extending arm, an agitator secured to the shaft above the apertured disk, and a driving mechanism connected with the shaft, of a crank-shaft, a pitman connection between the crank-shaft and the projecting arm of the apertured disk, a bar pivoted near the front of the machine, a tongue or pole connected with the bar, and a connection between the pivoted bar and the crank-shaft, substantially as shown and described.

6. The combination, with a wheeled frame and a transverse crank-shaft journaled in the frame between its ends and provided with an operative mechanism, of plow-beams adjustably pivoted upon the ends of the said shaft, a transverse rock-shaft journaled in the rear of the frame and provided with adjustable arms, a link connection between the beams and arms, and a connecting-rod uniting one of the said arms with an adjustable arm on the crank-shaft, substantially as shown and described.

7. The combination, with a wheeled frame and a transverse crank-shaft journaled in the frame between its ends and provided with an adjustable arm and means for operating the shaft, of plow-beams adjustably pivoted upon the ends of the said shaft, a transverse rock-shaft on the rear end of the frame and provided with adjustable arms through which the rear ends of the beams pass, links connecting the slotted arms and beams, and a rod connecting the arm on the crank-shaft with one of the slotted arms, substantially as shown and described.

8. The combination, with the frame having supporting and guide wheels and a tongue, of a hopper mounted on the frame and having a discharge opening or outlet and a cut-off therefor connected with the tongue to close the outlet when the machine is turning around, substantially as shown and described.

LEHMAN B. BUZBY.

Witnesses:
WILLIAM BUZBY,
HOWARD BUZBY.